(12) United States Patent
Cheng

(10) Patent No.: US 8,002,481 B2
(45) Date of Patent: Aug. 23, 2011

(54) CAMERA PROTECTING ASSEMBLY AND ASSEMBLING METHOD THEREOF

(75) Inventor: Chao-Yuan Cheng, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/826,804

(22) Filed: Jun. 30, 2010

(65) Prior Publication Data

US 2011/0116784 A1    May 19, 2011

(30) Foreign Application Priority Data

Nov. 19, 2009 (CN) .......................... 2009 1 0309982

(51) Int. Cl.
*G03B 17/00* (2006.01)

(52) U.S. Cl. ....................................................... 396/448

(58) Field of Classification Search .................. 396/448
See application file for complete search history.

(56) References Cited

U.S. PATENT DOCUMENTS

| 2010/0183290 A1* | 7/2010 | Yang et al. ..................... 396/448 |
| 2011/0043913 A1* | 2/2011 | Wang ............................. 359/511 |

* cited by examiner

*Primary Examiner* — Rodney Fuller

(74) *Attorney, Agent, or Firm* — Altis Law Group, Inc.

(57) ABSTRACT

A camera protecting assembly is disclosed including a cover defining an opening, a fixing member and a housing. The fixing member includes a base portion, a fixing portion connected to the base portion, and a securing slot enclosed between the base portion and the fixing portion. The housing attaches the cover and the fixing member. The securing slot secures the circumferential wall of the opening, and the fixing portion is fixed to the cover. The assembly method is accordingly disclosed.

11 Claims, 4 Drawing Sheets

CAMERA PROTECTING ASSEMBLY AND ASSEMBLING METHOD THEREOF

BACKGROUND

1. Technical Field

The present disclosure relates to a camera protecting assembly and an assembling method thereof.

2. Description of the Related Art

Camera modules are widely used with portable electronic devices such as mobile phones. Because exposure of the camera module to foreign objects can cause damage, a camera protecting assembly is usually provided. The camera module of a portable electronic device often has a protecting assembly housing glued to it and covers the camera module. However, the gluing operation may not position the protecting assembly properly relative to the camera module. Since glue can lose its adhesiveness, or tack, over a period of time, the displacement and the tack loss, may adversely affect the performance of the camera module.

Therefore, there is room for improvement within the art.

BRIEF DESCRIPTION OF THE DRAWINGS

Many aspects of the present camera protecting assembly can be better understood with reference to the following drawings. The components in the drawings are not necessarily drawn to scale, the emphasis instead being placed upon clearly illustrating the principles of the present camera protecting assembly using the same. Moreover, in the drawings, like reference numerals designate corresponding parts throughout the several views.

DETAILED DESCRIPTION

Figure 1:
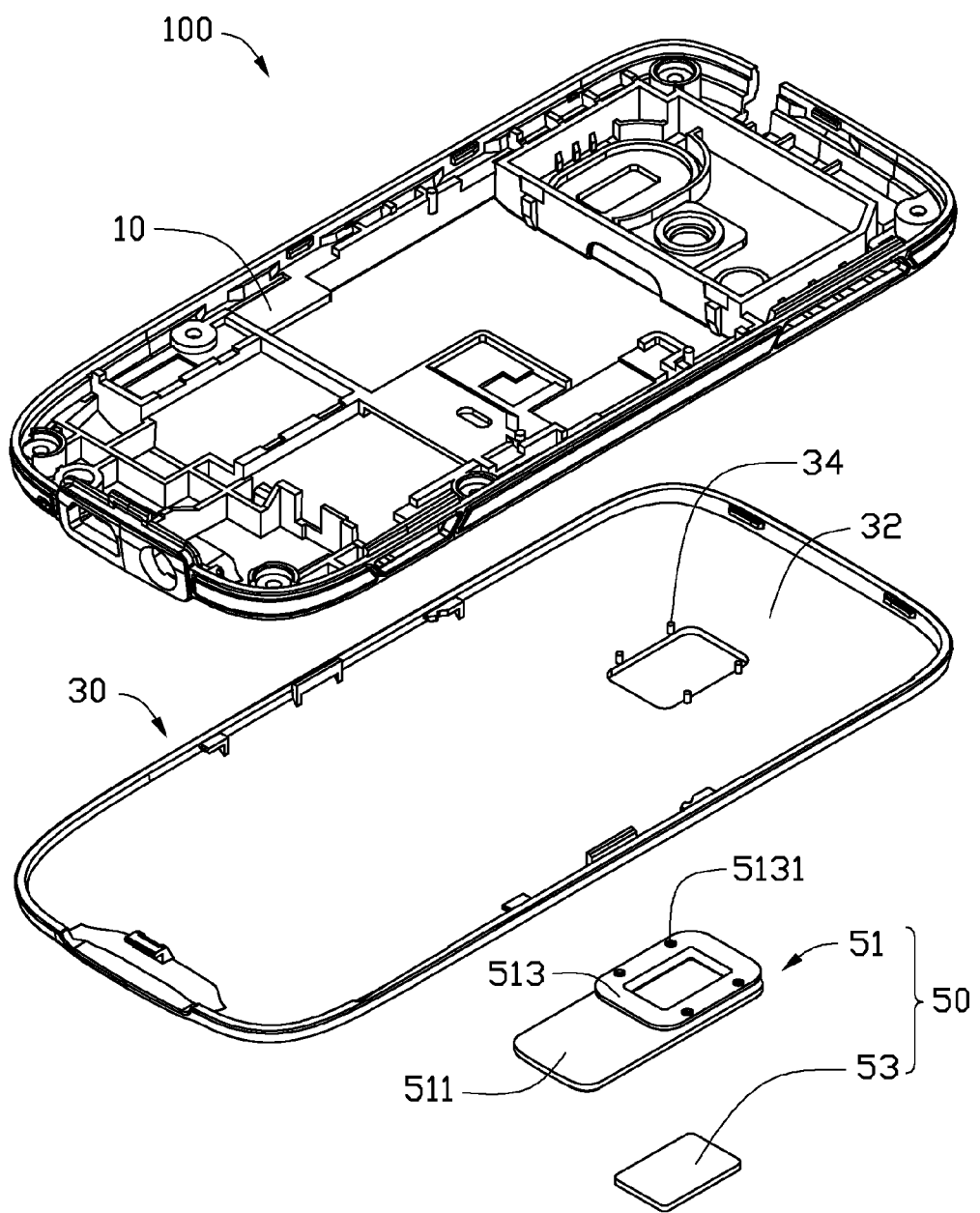
FIG. 1 is an isometric view of a camera protecting assembly according to an exemplary embodiment.
Figure 2:
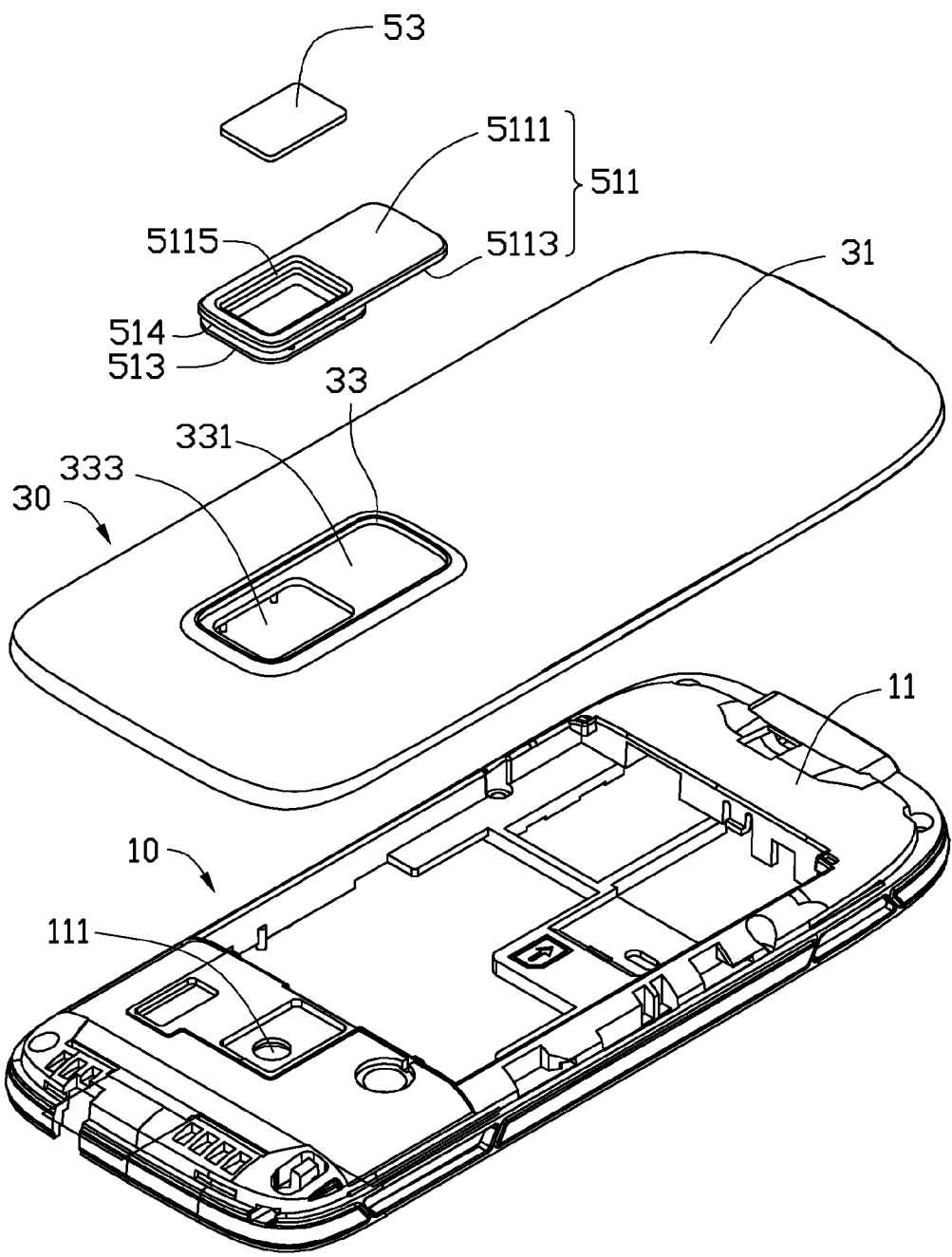
FIG. 2 is another isometric view of a camera protecting assembly shown in FIG. 1, showing another aspect.

FIGS. 1 and 2 show camera protecting assembly 100 including a housing 10, a cover 30 (such as a battery cover) and a cover unit 50. The cover 30 can be attached and detached from the housing 10. The cover unit 50 is secured to the cover 30.

The housing 10 includes an exterior wall 11. The exterior wall 11 defines a recess 111 for securing a camera module (not shown) therein.

The cover 30 engages with and covers the exterior wall 11 when attached to the housing 10. The cover 30 includes an outside wall 31 and an opposite inside wall 32. The cover 30 further includes a fixing groove 33 recessed in the outside wall and fixing posts 34 on the inside wall. A bottom wall 331 of the fixing groove 33 defines an opening 333 aligning with the recess 111 and allows light penetrating through the opening 333 to enter and pass through the lens of the camera module received inside the recess 111. The fixing posts 34 protrude from the inside wall 32, surrounding the opening 333.

Figure 4:
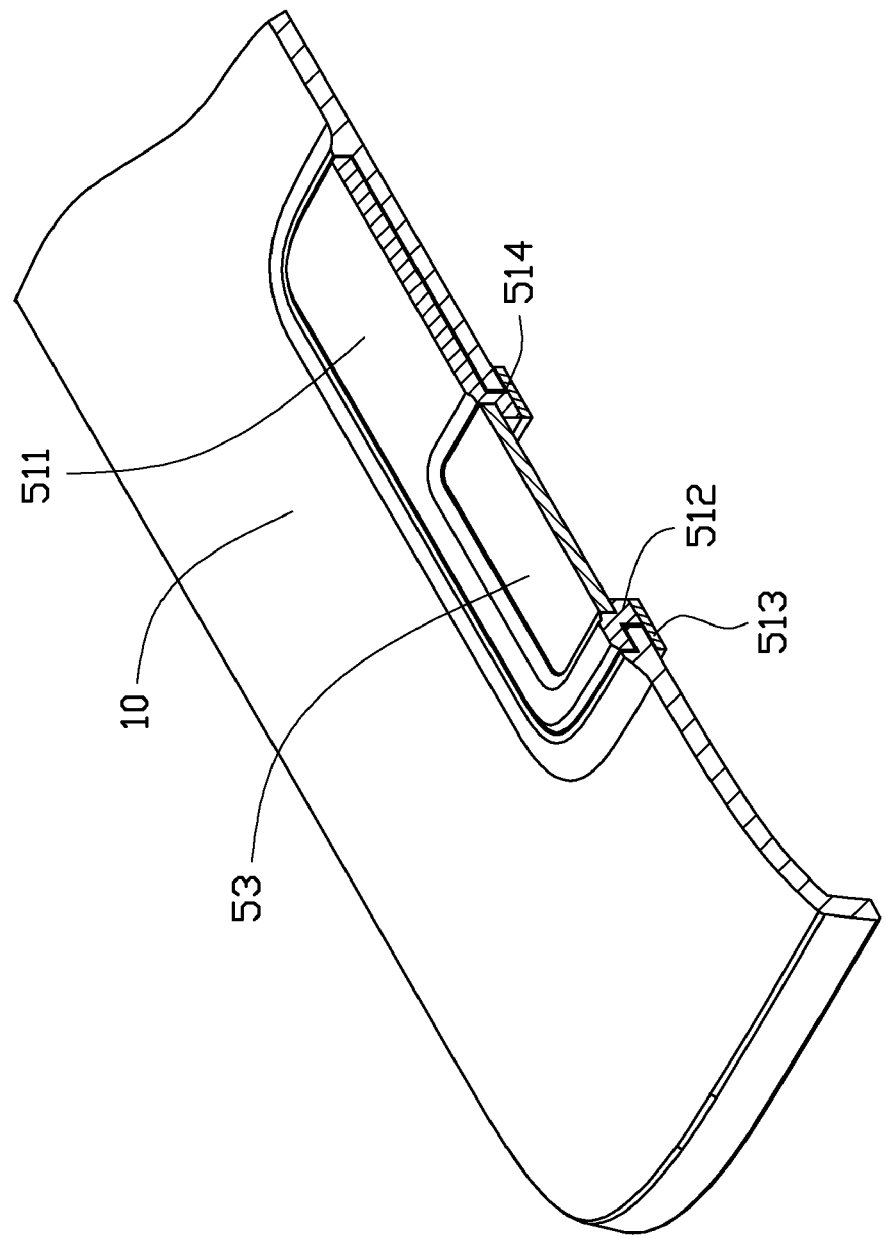
FIG. 4 is a cross sectional view of the camera protecting assembly shown in FIG. 3, taken along line IV-IV.

Referring further to FIG. 4, the cover unit 50 can be integrally secured into the fixing groove 33 to cover the opening 333 and protect the camera module from damage, such as scrapes. The cover unit 50 includes a fixing member 51 and a transparent lens 53. The lens 53 can be made of transparent materials and fixed to the receiving groove 5115 of the fixing member 51.

The fixing member 51 includes a base portion 511 and a fixing portion 513. The base portion 511 includes a mounting surface 5111 and an opposite contacting surface 5113. A receiving groove 5115 is defined through the mounting surface 5111 and the contacting surface 5113 for receiving the lens 53. The fixing portion 513 may be resilient and connects to the base portion 511. The fixing portion 513 is parallel with the base portion 511, and encloses a securing slot 514. The securing slot 514 engages with the opening 333, and secures circumferentially with the wall of the opening 333. The fixing portion 513 defines fixing holes 5131 corresponding to the fixing posts 34. The fixing holes 5131 have substantially the same shape and size as the fixing posts 34. The fixing posts 34 fit within the fixing holes 5131.

Figure 3:
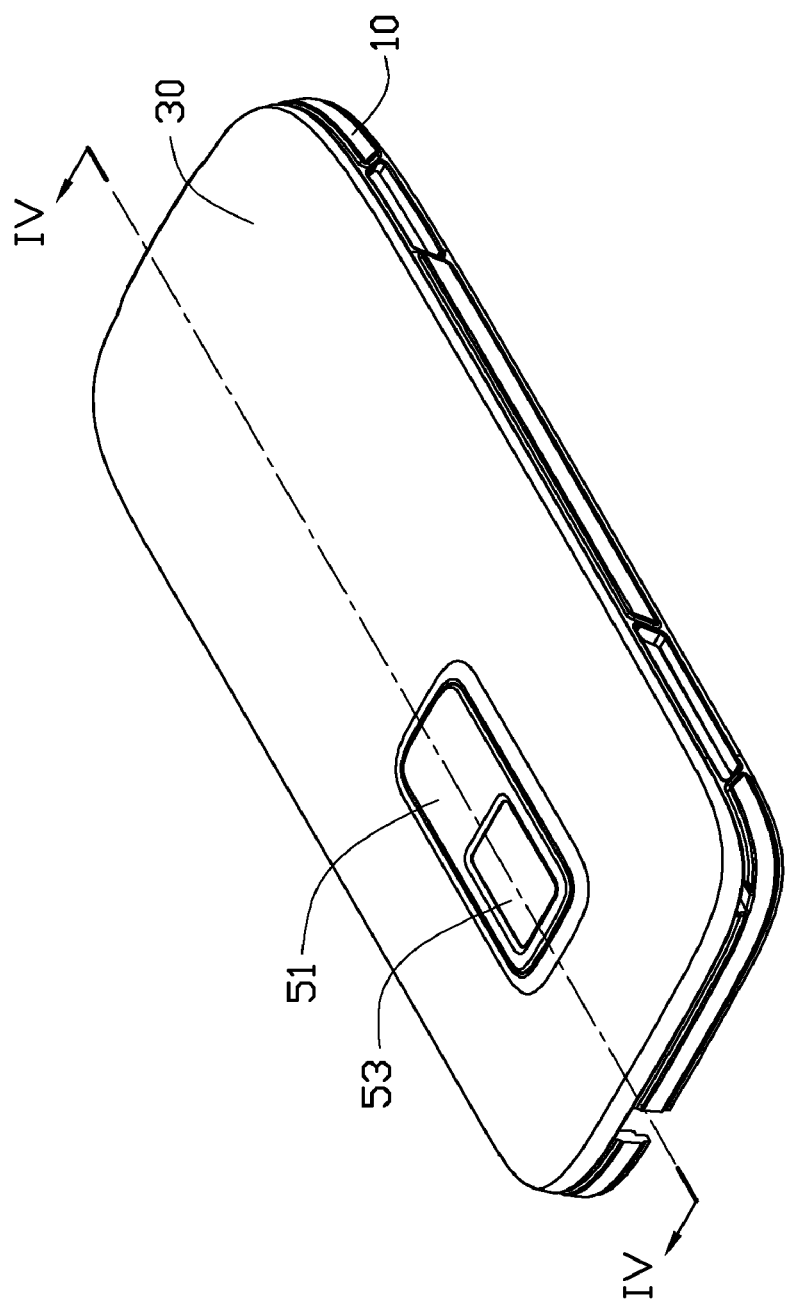
FIG. 3 is an assembled view of the camera protecting assembly shown in FIG. 1.

FIGS. 3 and 4 show the camera protecting assembly 100 in the assembled status. The camera protecting assembly 100 can be assembled as follows.

The fixing member 51 is injection molded to include the base portion 511 and the fixing portion 513. The fixing portion 513 is pressed into the outside wall 31, deforming its outer edge. The fixing portion 513 then passes through the opening 333 to the inside of cover 30. After completely passing through the opening and becoming adjacent the inside wall 32, the outer edge of the fixing portion 513 returns to its undeformed state. At this time, the securing slot 514 engages with the opening 333, and accordingly secures the circumferential wall of the opening 333.

The fixing posts 34 are provided and heated to fix into the fixing holes 5131 and the inside wall 32, fixing the fixing member 51 to the cover 30. The lens 53 is glued into the receiving groove 5115. Meanwhile, the lens 53 is positioned above the receiving groove 5115 and the opening 333. After that, the cover 30 and the cover unit 50 are attached to the housing 10. The lens 53, the receiving groove 5115, the opening 333 and the recess 111 aligns with each other, allowing outside light to enter and pass through the lens on the camera module.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A camera protecting assembly, comprising:
    a cover defining an opening having a circumferential wall, the cover forming fixing posts around the opening;
    a fixing member comprising a base portion and a fixing portion, the fixing portion connected to the base portion, the fixing portion defining fixing holes receiving and securing the fixing posts, and a securing slot formed between the base portion and the fixing portion, the securing slot securing the circumferential wall of the opening therein, the fixing portion fixed to the cover; and
    a housing having the cover and the fixing member attached thereon.

2. The camera protecting assembly as claimed in claim 1, wherein the fixing portion is resilient.

3. The camera protecting assembly as claimed in claim 1, wherein the base portion and the fixing portion are secured on opposite sides of the cover.

4. The camera protecting assembly as claimed in claim 3, wherein the fixing portion and the base portion are injection molded as an integral unit.

5. The camera protecting assembly as claimed in claim 4, wherein the base portion defines a receiving groove aligning with the opening.

6. The camera protecting assembly as claimed in claim 5, further comprises a lens secured in the receiving groove.

7. The camera protecting assembly as claimed in claim 6, wherein the housing defines a recess, the lens, the receiving groove, the opening and the recess align with each other.

8. An assembling method for a camera protecting assembly, comprising:

providing a cover of the camera protecting assembly, the cover defining an opening having a circumferential wall and an inside wall; and providing a fixing member of the camera protecting assembly, the fixing member comprising a base portion and a fixing portion connected to the base portion, and a securing slot formed between the base portion and the fixing portion, the inside wall of the cover forming fixing posts thereon, the fixing portion defining fixing holes therein;

fixing the fixing member to the cover by securing the circumferential wall of the opening in the securing slot, and fixing the fixing portion to the cover by receiving securing the fixing posts into the fixing holes; and providing a housing of the camera protecting assembly;

attaching the cover and the fixing member on the housing.

9. The assembling method as claimed in claim 8, further comprising injection molding the base portion and the fixing portion with each other.

10. The assembling method as claimed in claim 8, wherein the cover includes an outside wall and an opposite inside wall, the fixing portion having an outer edge, the fixing portion is pressed through the opening by deforming the outer edge of the fixing portion.

11. The assembling method as claimed in claim 8, further comprising securing a lens of the camera protecting assembly into the cover.

\* \* \* \* \*